(12) United States Patent
Lee et al.

(10) Patent No.: US 10,345,893 B2
(45) Date of Patent: Jul. 9, 2019

(54) WEARABLE DEVICE AND CONTROL METHOD THEREFOR

(71) Applicant: LG ELECTRONICS INC., Seoul (KR)

(72) Inventors: Juhwan Lee, Seoul (KR); Sihwa Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 18 days.

(21) Appl. No.: 15/527,659

(22) PCT Filed: Nov. 17, 2014

(86) PCT No.: PCT/KR2014/011002
§ 371 (c)(1),
(2) Date: May 17, 2017

(87) PCT Pub. No.: WO2016/080557
PCT Pub. Date: May 26, 2016

(65) Prior Publication Data
US 2018/0307301 A1    Oct. 25, 2018

(51) Int. Cl.
*G06F 3/01* (2006.01)
*G06F 3/14* (2006.01)
*G03B 21/00* (2006.01)
*G06F 1/16* (2006.01)
*G06F 3/0346* (2013.01)
*G06F 3/0484* (2013.01)
(Continued)

(52) U.S. Cl.
CPC .......... *G06F 3/011* (2013.01); *G03B 21/005* (2013.01); *G06F 1/163* (2013.01); *G06F 3/013* (2013.01); *G06F 3/0346* (2013.01); *G06F 3/04845* (2013.01); *G06F 3/14* (2013.01); *G06F 3/147* (2013.01); *G06F 3/167* (2013.01); *G03B 21/10* (2013.01); *G09G 2320/0261* (2013.01); *G09G 2320/068* (2013.01); *G09G 2340/14* (2013.01); *G09G 2354/00* (2013.01); *G09G 2380/02* (2013.01)

(58) Field of Classification Search
None
See application file for complete search history.

(56) References Cited

U.S. PATENT DOCUMENTS 10,168,821 B2 *   1/2019   Chi ................... H04B 1/385
2013/0222271 A1   8/2013   Alberth et al.
(Continued)

OTHER PUBLICATIONS

PCT International Application No. PCT/KR2014/011002, Written Opinion of the International Searching Authority dated Jun. 25, 2015, 25 pages.
(Continued)

*Primary Examiner* — Kenneth B Lee, Jr
(74) *Attorney, Agent, or Firm* — Lee Hong Degerman Kang & Waimey

(57) ABSTRACT

A wearable device according to one embodiment of the present specification detects the shape and grip strength of the hand on the basis of the tendons of a wearer's wrist, and can change a display position of an image on the basis of the rotating direction of the wearable device. In addition, the wearable device can sense context information of the wearer by using the tendons of the wrist, thereby providing an improved information providing method.

21 Claims, 12 Drawing Sheets

(51) Int. Cl.
*G06F 3/16* (2006.01)
*G06F 3/147* (2006.01)
*G03B 21/10* (2006.01)

(56) References Cited

U.S. PATENT DOCUMENTS

| | | | |
|---|---|---|---|
| 2014/0049417 A1 | 2/2014 | Abdurrahman et al. | |
| 2014/0160078 A1* | 6/2014 | Seo ........................ | G06F 3/017 345/175 |
| 2014/0239065 A1* | 8/2014 | Zhou ....................... | G06F 1/163 235/380 |

OTHER PUBLICATIONS

Ashour, A., "Relationship between Isometric Muscle Force and Surface EMG of Wrist Muscles at Different Shoulder and Elbow Angles," Journal of American Science, Oct. 2014, 9 pages.

* cited by examiner

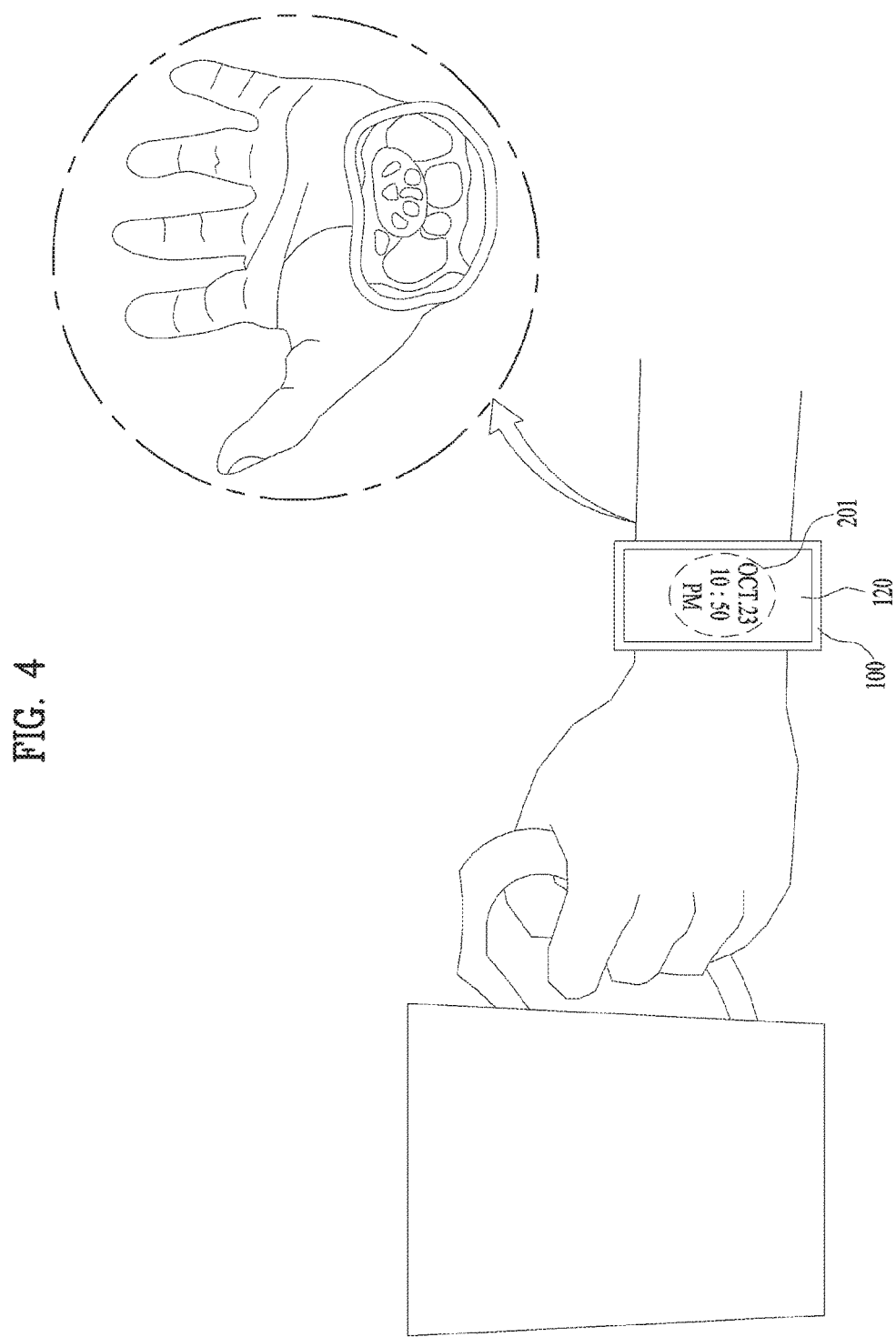

(a)　　　　　　　　　(b)

(a)                    (a)

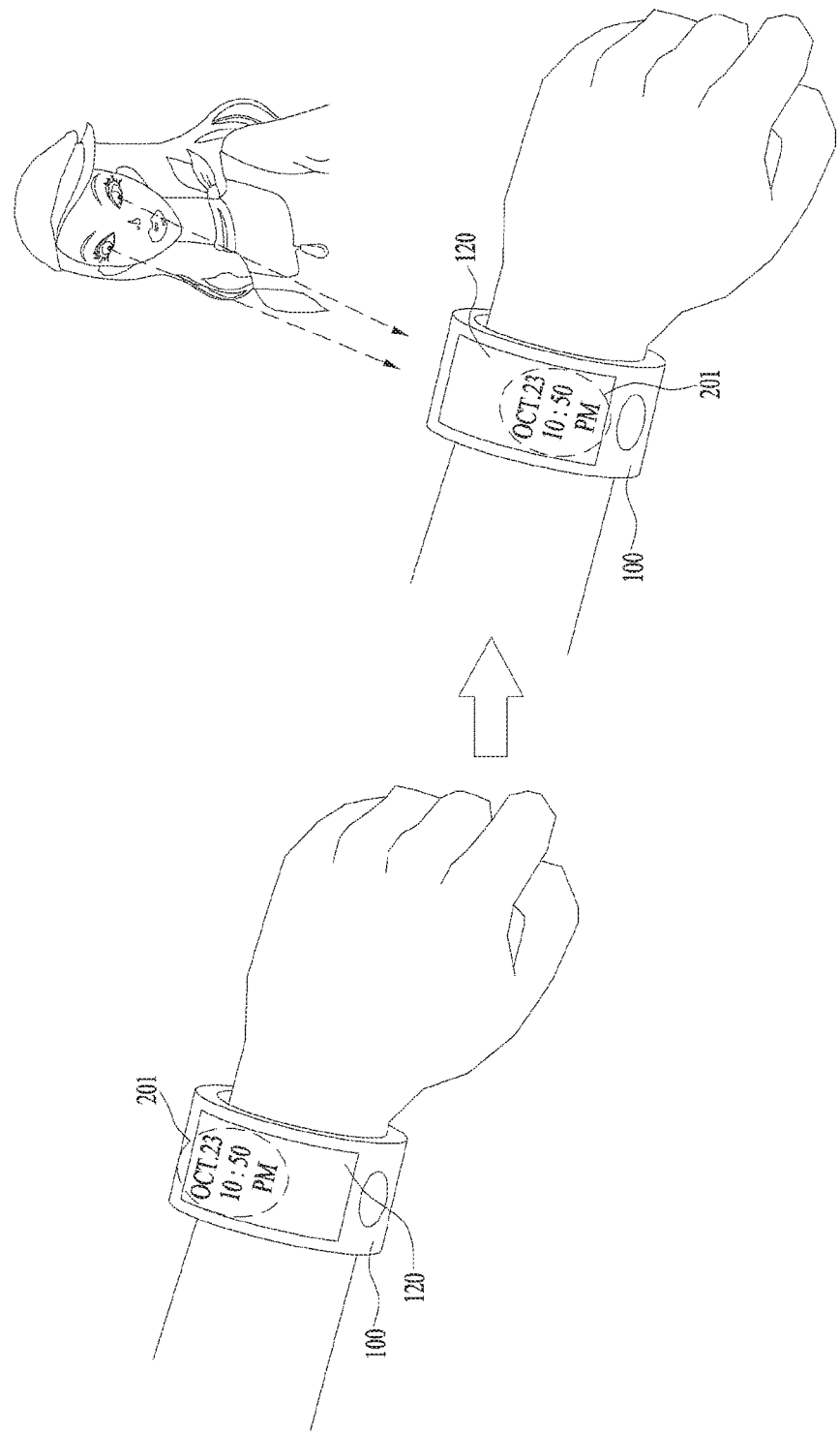

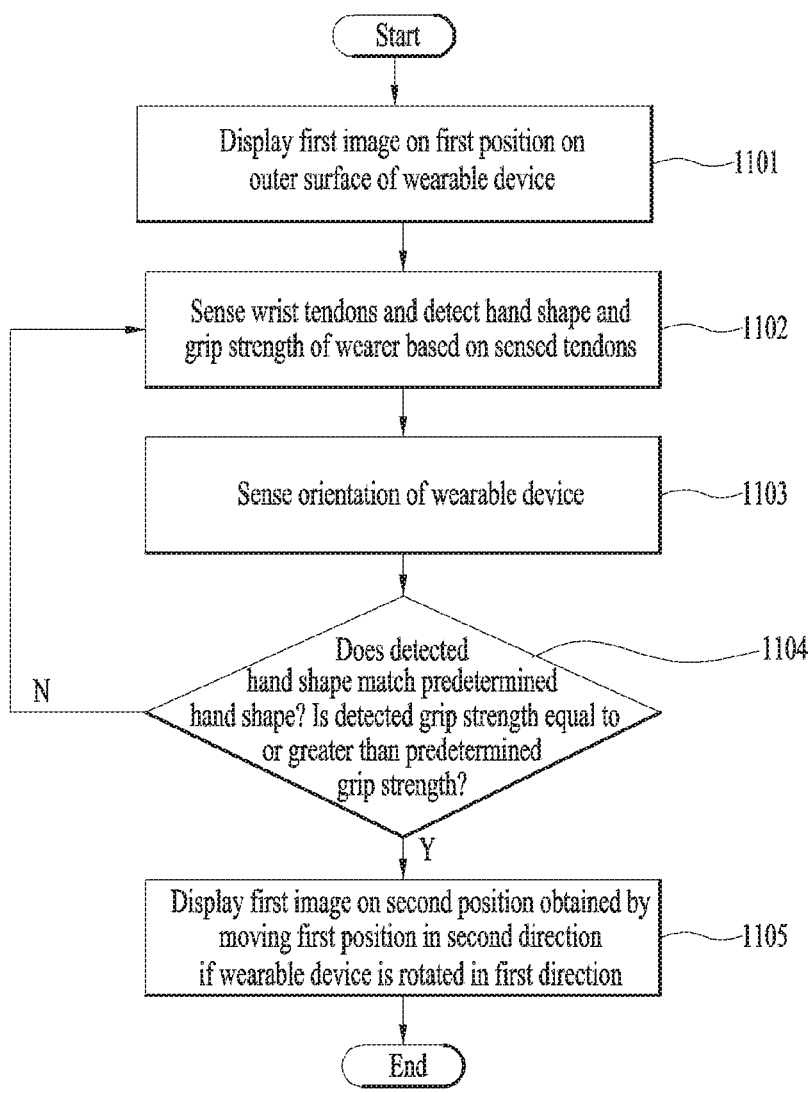

WEARABLE DEVICE AND CONTROL METHOD THEREFOR

CROSS-REFERENCE TO RELATED APPLICATIONS

This application is the National Stage filing under 35 U.S.C. 371 of International Application No. PCT/KR2014/011002, filed on Nov. 17, 2014, the contents of which are all hereby incorporated by reference herein in its entirety.

TECHNICAL FIELD

The present invention relates to a wearable device and control method therefor.

BACKGROUND ART

FIG. 1 illustrates that a wearer of a wearable device holds a box.

A wearable device 100 capable of being worn on a wrist can be named in various ways, for example, a smart watch, a wrist band, etc. With the advent of a thin and flexible display, various wearable devices 100 have been developed.

Referring to FIG. 1, the wearer of the wearable device 100 holds the box. The wearable device 100 worn on the wrist generally displays an image on the back of the wearer's hand. Thus, to check a display of the wearable device 100, the wearer needs to rotate the wrist such that the back of the hand faces the wearer's face. However, when the wearer holds a heavy load as shown in FIG. 1, the wearer cannot rotate the wrist. In other words, as shown in the left drawing of FIG. 1, the wearer has difficulty in checking the display of the wearable device 100 while holding the box.

Therefore, a method of enabling the wearer to easily check information (e.g., the current time) displayed on the wearable device 100 even when a movement of the wearer is restricted is required.

DISCLOSURE OF THE INVENTION

Technical Task

The object of the present invention is to provide a wearable device for changing a display based on context information of a wearer and control method therefor. More particularly, the invention is to provide a wearable device capable of detecting wearer's context information by sensing tendons of a wearer's wrist.

Technical Solutions

In an aspect of the present invention, provided herein is a wearable device configured to be worn on at least part of a wrist, including: a display unit configured to display an image on at least part of an outer surface of the wearable device; a tendon sensing unit configured to sense tendons of the wrist; an orientation sensing unit configured to sense an orientation of the wearable device; and a processor for controlling the display unit, the tendon sensing unit, and the orientation sensing unit. In this case, the processor may be configured to display a first image on a first position on the outer surface of the wearable device; detect a hand shape and grip strength of a wearer by using the tendon sensing unit; and when the detected hand shape matches a predetermined hand shape, the detected grip strength is equal to or greater than a predetermined grip strength, and a rotation of a wearable device in a first direction is detected through the orientation sensing unit, display the first image on a second position obtained by moving the first position in a second direction. In addition, the first and second directions may correspond to rotation directions with respect to the wrist and be opposite each other.

In another aspect of the present invention, provided herein is a method of controlling a wearable device configured to be worn on at least part of a wrist, including: displaying a first image on a first position on an outer surface of the wearable device; sensing tendons of the wrist and detecting a hand shape and grip strength of a wearer based on the sensed tendons; sensing an orientation of the wearable device; and when the detected hand shape matches a predetermined hand shape, the detected grip strength is equal to or greater than a predetermined grip strength, and the wearable device is rotated in a first direction, displaying the first image on a second position obtained by moving the first position in a second direction. In this case, the first and second directions may correspond to rotation directions with respect to the wrist and be opposite each other.

Advantageous Effects

According to the present invention, a wearable device can provide an improved interface to a wearer.

In addition, the wearable device can change a display by sensing wearer's wrist tendons, thereby efficiently providing information to the wearer even when a movement of the wearer is restricted.

Moreover, the wearable device can change the display based on an intuitive and ergonomic gesture, thereby providing improved user experience.

DESCRIPTION OF DRAWINGS

FIG. 4 illustrates wrist tendons.

FIG. 10 illustrates that that a display position is changed according to gaze.

FIG. 11 is a flowchart for explaining a method for controlling the wearable device according to an embodiment of the present invention.

BEST MODE FOR INVENTION

Hereinafter, the embodiments of the present invention will be described in detail with reference to the accompanying drawings and the details illustrated in the accompanying drawings but the scope of the present invention is not limited or restricted to the embodiments described herein.

Although the terms used in the present specification are selected, as much as possible, from general terms that are widely used at present while taking into consideration their functions, these terms may be replaced by other terms based on intentions of those skilled in the art, customs, emergence of new technologies, or the like. In addition, terms that are arbitrarily selected by the applicant may be used in a specific case. In this specific case, meanings of these terms will be disclosed in detail in the corresponding part of the description of the invention. Accordingly, the terms used herein should be defined based on practical meanings thereof and the whole content of this specification, rather than based on names of the terms.

In the following description, a wearable device that is worn on a wrist of a wearer (user) can include various types of wearable devices such as a smart watch, a wrist band, etc.

Figure 2:
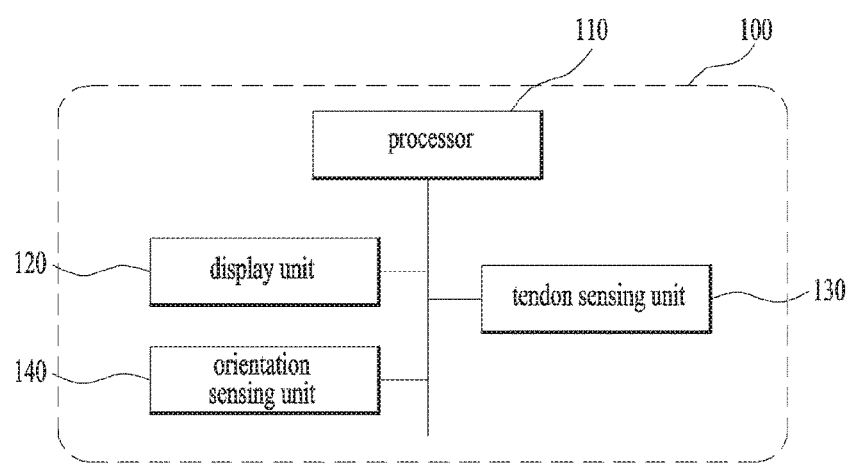
FIG. 2 is a configuration diagram of a wearable device according to an embodiment of the present invention.

FIG. 2 is a configuration diagram of a wearable device according to an embodiment of the present invention.

The wearable device according to an embodiment of the present invention can include a display unit 120, a tendon sensing unit 130, an orientation sensing unit 140, and a processor 110.

The display unit 120 can be configured to display an image on at least a part of an outer surface of the wearable device 100. The outer surface of the wearable device 100 means the opposite surface of the inner surface touched with the wearer's wrist when the wearer wears the wearable device 100. The display unit 120 may include a liquid crystal display (LCD), an organic light emitting diode (OLED) display, and a plasma display. In addition, the display unit 120 may be implemented using a flexible display. Moreover, the display unit 120 may include a projection unit, a prism and/or a lens and project an image on the outer surface of the wearable device 100. Furthermore, the display unit 120 may include a plurality of display panels. The display unit 120 may be a touch sensitive display. Further, the above-mentioned configurations of the display unit 120 may be combined in a selective manner.

The tendon sensing unit 130 can be configured to sense tendons passing through the wrist of the wearer wearing the wearable device 100. The tendon sensing unit 130 may sense not only shapes of tendons, which are changed according to a movement of fingers, but also a change in grip strength and a movement speed of the fingers. The tendon sensing unit 130 may sense movement characteristics of the tendons and, in this case, the movement characteristics may include a shape of the fingers, a gesture, a movement speed of the fingers, a movement direction of the wrist, a movement speed of the wrist, and/or grip strength. For example, the tendon sensing unit 130 may be configured with a series of strength sensors disposed on the inner of the wearable device 100. Further, the tendon sensing unit 130 may sense the tendons by analyzing electrical signals from the wrist.

The orientation sensing unit 140 can be configured to sense an orientation of the wearable device 100. For example, the orientation sensing unit 140 may include a GPS sensor, a gyro sensor, an accelerator sensor, and/or an attitude sensor. Further, the orientation sensing unit 140 may sense a direction of the wearable device 100 with respect to position, rotation, speed, acceleration and/or gravity of the wearable device 100.

The processor 110 can be configured to control the display unit 120, the tendon sensing unit 130, and the orientation sensing unit 140. In addition, the processor 110 may control other components included in the wearable device 100, which will be described later. Moreover, the processor 110 may launch various applications by processing data of the wearable device 100. Further, the processor may control the wearable device 100 and contents executed in the wearable device 100 based on commands.

In addition, the wearable device 100 may further include components not shown in FIG. 2. For example, the wearable device 100 may further include a memory, a power supply, a housing, an audio receiving unit, an audio output unit, a video receiving unit, a proximity sensor, and/or an image sensing unit. The image sensing unit may be configured to sense an image using a visible light, an infrared light, an ultraviolet light, a magnetic field, and/or a sound wave.

Moreover, the aforementioned components may be selectively combined with each other according to the manufacturer or the type of the wearable device 100. The components may be connected to each other through a bus and controlled by the processor 110.

FIG. 2, which shows the configuration of the wearable device 100, is a block diagram according to an exemplary embodiment. Here, the separately illustrated blocks respectively show the units of the wearable device 100, which are logically differentiated from one another. Accordingly, the above-described units of the wearable device 100 can be mounted on a single chip or multiple chips depending on design.

Meanwhile, the wearable device 100 of the present disclosure may be controlled by various inputs. For example, the wearable device 100 may include a physical button and receive an input through the physical button. In addition, the wearable device 100 may include a voice receiving unit. Specifically, the wearable device 100 may perform voice recognition based on a received voice and then perform operations based on the voice recognition. More specifically, the wearable device 100 may perform voice recognition on a syllable, word, or sentence basis. The wearable device 100 may combine the recognized syllable, word, or sentence to perform the voice recognition. Moreover, the wearable device 100 may perform image analysis using an image sensing unit and then perform operations based on the analyzed image. Furthermore, the wearable device 100 may include a touch sensing unit. Specifically, the wearable device 100 may perform operations based on a touch, which is inputted through the touch sensing unit. Further, the wearable device 100 may be controlled based on a combination of the above-described inputs.

FIGS. 3a to 3d illustrate various embodiments of the wearable device.

The wearable device 100 of the present disclosure may have various forms. For example, the wearable device 100 of the present invention may be implemented such that the wearable device 100 can be worn on the wrist to sense the wearer's wrist tendons. In addition, although FIGS. 3a to 3d shows that the wearable device 100 displays the current time and data on the display unit 120 as a first image 201, it is merely an example and various information can be displayed as the first image 201. For example, the first image 201 may include weather, current time, current date, received message content, message sender information, and/or schedule information.

Figure 3A:
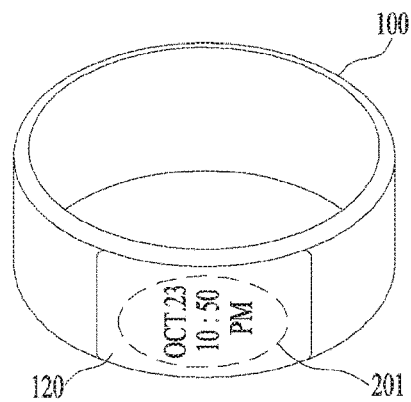
FIGS. 3a to 3d illustrate various embodiments of the wearable device.

As shown in FIG. 3a, the wearable device 100 may be implemented in the form of a smart watch or a wrist band. The wearable device 100 may be made out of flexible materials. In addition, the display unit 120 may be a flexible display unit. Further, the wearable device 100 may further include a coupling part for enabling the wearer to wear the wearable device 100 on the wrist.

Figure 3B:
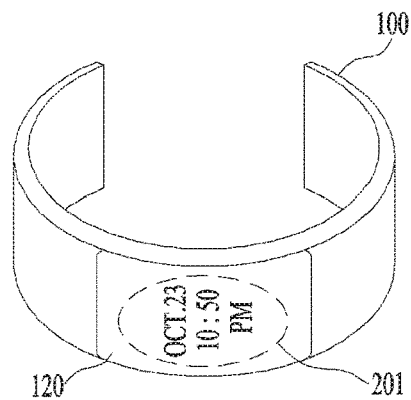

In addition, as shown in FIG. 3b, the wearable device 100 may include an opening part. That is, the wearable device 100 is made out of flexible materials and it may be worn on the wrist using the opening part.

Figure 3C:
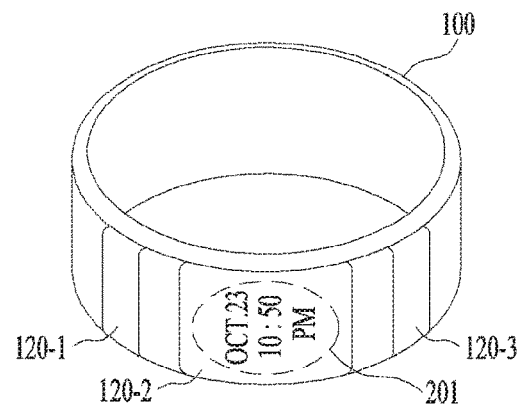

Moreover, as shown in FIG. 3c, the wearable device 100 may include a plurality of display units (or panels) 120-1, 120-2, and 120-3.

Figure 3D:
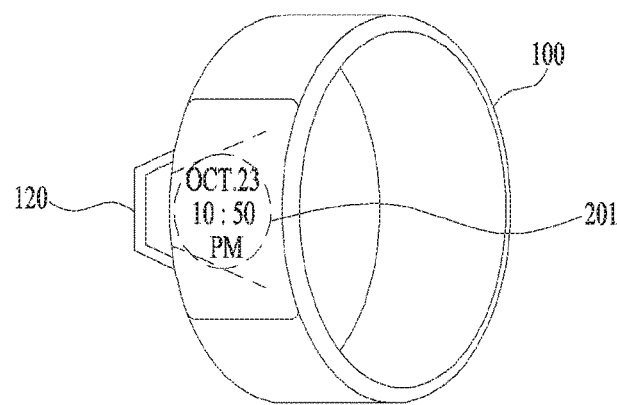

Furthermore, as shown in FIG. 3d, the wearable device 100 may include the display unit 120 for projecting the first image 201 to the wearable device 100. In addition, the display unit 120 may include a prism and/or a lens for the projection. In this case, the display unit 120 may adjust a projection direction of the first image 201 by being rotated with respect to a fixed position.

FIGS. 3a to 3d shows examples of the wearable device 100 of the present invention. The wearable device 100 of the present invention may include a random wearable device that can be worn on a wearer's wrist.

Hereinafter, operations of the wearable device 100 will be described with reference to FIGS. 4 to 11. The operations of the wearable device 100 may be performed by the components of the wearable device 100 described with reference FIGS. 2 and 3. In addition, it is assumed that the operations of the wearable device 100 are the same as operations of the processor.

FIG. 4 illustrates wrist tendons.

Figure 1:
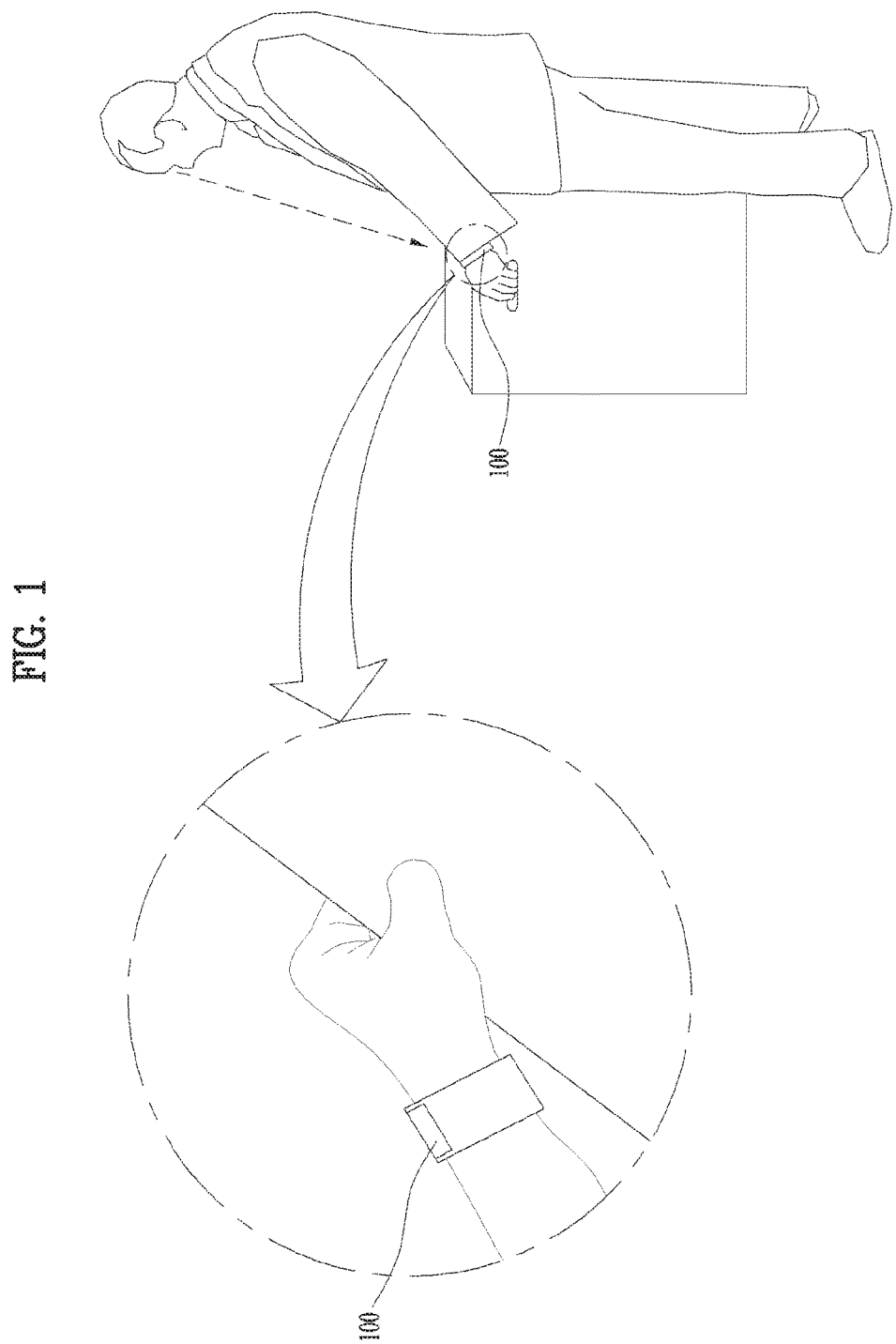
FIG. 1 illustrates that a wearer of a wearable device holds a box.

As described with reference to FIG. 1, when the wearer of the wearable device 100 carries the load, the wearer's movement is restricted. Thus, a method for enabling a wearer to easily check information displayed on the wearable device 100 when carrying a load is required. To this end, the wearable device 100 need to determine whether the wearer's movement is restricted, for example, whether the wearer carries the load.

In FIG. 4, the wearer of the wearable device 100 holds a cup. The tendons passing through the wrist are illustrated in the circle represented by an alternate long and short dash line. A carpal tunnel is within the wrist and finger flexor tendons controlling a movement of each finger are in the carpal tunnel. The finger flexor tendons include nine tendons and one nerve. The fingers are moved by various combinations of the tendons included in the finger flexor tendons.

Thus, the wearable device 100 can detect shapes of the fingers by sensing shapes of the wrist tendons and changes in the shapes. For example, in FIG. 4, the wearable device 100 may recognize that the wearer currently makes a fist with the fingers based on the sensed tendons. As another example, the wearable device 100 may determine whether a detected hand shape matches a predetermined hand shape. In this case, the predetermined hand shape may be a hand shape for holding an object.

However, in some cases, it is difficult for the wearable device 100 to determine whether the wearer holds an object based on the hand shape only. For example, the wearer may make a fist easily. To determine whether the wearer holds an object, the wearable device 100 may be configured to determine grip strength of the hand by sensing the wrist tendons. For example, only when the hand grip strength is equal to or greater than predetermined grip strength, the wearable device may determine that the wearer holds an object.

Therefore, the wearable device 100 can determine whether the wearer holds an object based on both of the hand grip strength and the hand shape. For example, if the hand shape matches the predetermined hand shape and the hand grip strength is equal to or greater than the predetermined grip strength, the wearable device 100 may determine that the wearer holds an object.

Exceptionally, when both of the two conditions is satisfied, the wearer may not hold an object. For example, in some cases, the wearer may run with clenched fists. In this case, the wearer's movement is not restricted. That is, the wearer's movement is generally restricted when the wears holds an object. Thus, the wearable device 100 may monitor the movement of the wearable device 100 using the orientation sensing unit 140. For example, when the wearer runs, the wearable device 100 may determine that the movement is intense. Therefore, the wearable device may perform display switching, which will be described later, only when the movement of the wearable device 100 is within a predetermined range.

In addition, when the wearer cannot use both hands, the wearable device 100 may perform the display switching. For example, the wearable device 100 may determine whether the wearer cannot use both hands by sensing an electrical signal. Moreover, two wearable devices 100 are worn on the wear's both wrists and communicate with each other to determine whether the wearer holds an object with both hands. Furthermore, the wearable device 100 may determine whether the wearer holds an object with both hands through image processing.

When determining that the wearer holds an object as described in FIG. 4, the wearable device 100 may perform operations which will be described later with reference to FIGS. 5 to 11. Moreover, the operations of the wearable device 100 mentioned with reference to FIG. 4 may be selectively combined with the operations of the wearable device 100 which will be described with reference to FIGS. 5 to 11. In the following description, first and second directions mean rotation directions with respect to the wearer's wrist and they are opposite each other. For example, the first direction may be a direction in which the display unit 120 of the wearable device 100 faces the floor and the second direction may be a direction in which the display unit 120 of the wearable device 100 faces eyes of the wearer.

Figure 5:
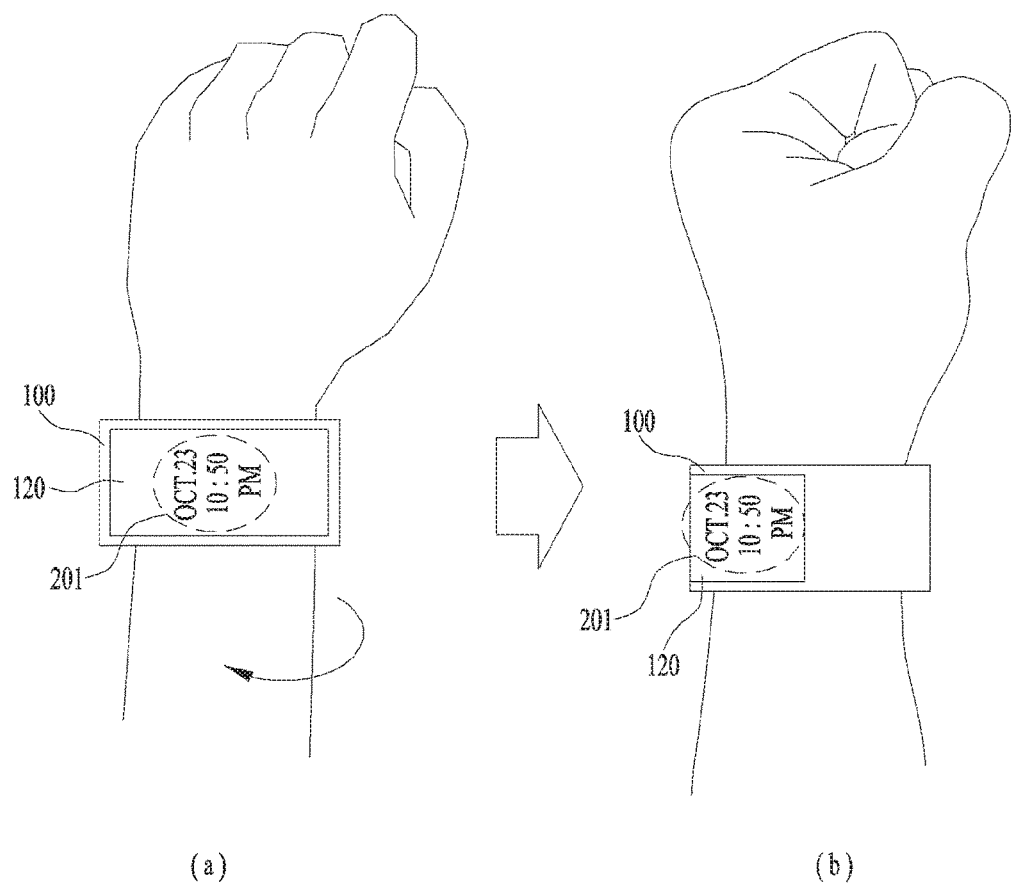
FIG. 5 illustrates that a display position is changed according to a wrist rotation.

FIG. 5 illustrates that a display position is changed according to a wrist rotation.

FIG. 5 (a) is a side perspective view of a hand holding an object (not shown in the drawing). In FIG. 5 (a), the wearable device 100 displays the first image 201 on a first position on the outer surface of the wearable device 100. When the wearer looks down the wearable device 100 while carrying an object as shown in FIG. 1, the wearer cannot see the first image 201 in FIG. 5 (a).

In this case, if a sensed hand shape matches the predetermined hand shape and a sensed grip strength is equal to or greater than the predetermined grip strength, the wearable device 100 can determine that the wearer holds an object (not shown in drawing). If the wearer rotates the wrist clockwise as shown in FIG. 5 (a), the wearable device 100 may sense the rotation of the wrist using the orientation sensing unit. Accordingly, if the wearable device 100 determines that the wearer rotates the wrist in the first direction while holding an object, the wearable device 100 may change a display position of the first image 201. Specifically, the wearable device 100 may change display the first image 201 by moving the display position in the second direction opposite to the first direction. In this case, the first direction and the second direction are opposite each other and they mean rotation directions with respect to the wearer's wrist.

FIG. 5 (b) is a diagram illustrating that the wearer looks down the wearable display 100 after the display position of the first image 201 is changed. As shown in FIG. 5 (b), when the display position of the first image is changed, the wearer can easily check the first image 201.

In addition, after displaying the first image 201 on the changed position, the mobile terminal can maintain the display position of the first image 201 even if the wearable device is rotated in the second direction. For example, after displaying the first image 201 on the changed position, the wearable device 100 may maintain the display position until determining that the wearer does not hold an object any more.

Meanwhile, when the sensed hand shape matches the predetermined hand shape and the grip strength equal to or greater than the predetermined grip strength is sensed during a predetermined time or more, the wearable device 100 may determine that the wearer holds an object. The reason for this is to prevent the wearable device 100 from frequently changing the display position of the first image 201.

In addition, after displaying the first image 201 on the changed position, the wearable device can be controlled by a voice command. This is because it is difficult for the wearer to control the wearable device 100 through the hand.

Moreover, the wearable device 100 may determine the changed display position of the first image 201 based on an orientation of the wearable device 100. For example, the wearable device 100 may determine a certain position in the direction opposite to the gravity as the changed display position of the first image 201. Alternatively, the changed display position of the first image 201 may be a predetermined position.

Furthermore, when displaying the first image 201 on the changed position, the wearable device 100 may change a part of the first image 201. For example, the wearable device 100 may change at least one of color, brightness, contrast, and a display size. Specifically, the wearable device 100 may increase the brightness or enlarge the display size to improve readability of the first image 201. In addition, when displaying the first image 201 on the changed position, the wearable device 100 may display a part of data of the first image 201. For example, the wearable device 100 may display only the current time among the data of the first image 201 on the changed display position.

Further, the operations of the wearable device 100 mentioned with reference to FIG. 5 may be selectively combined with the operation of the wearable device 100 mentioned with reference to FIG. 4 and the operations of the wearable device 100 which will be described with reference to FIGS. 6 to 11.

Figure 6:
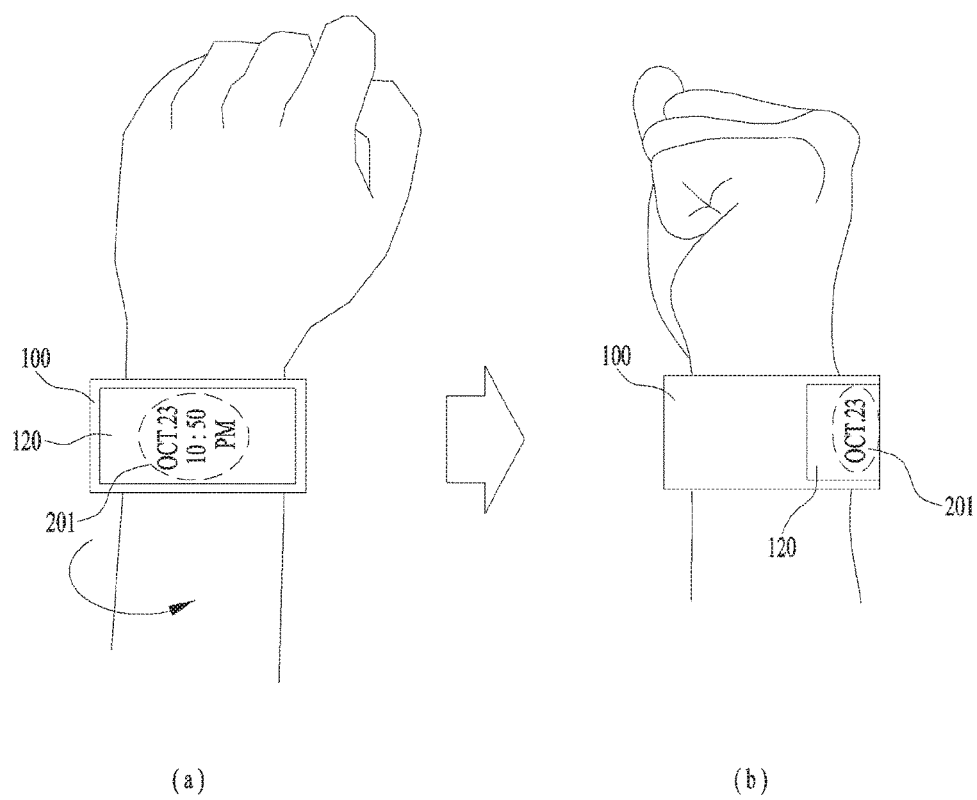
FIG. 6 illustrates that a display position is maintained according to a wrist rotation.

FIG. 6 illustrates that a display position is maintained according to a wrist rotation.

FIG. 6 (a) is a side perspective view of a hand holding an object (not shown in the drawing). In FIG. 6 (a), the wearable device 100 displays the first image 201 on a first position on the outer surface of the wearable device 100 and the wearer rotates the wrist counterclockwise.

FIG. 6 (b) shows the wearer's wrist rotated counterclockwise. As shown in FIG. 6 (b), the wearable device 100 maintains the display position of the first image 201.

When the wearer rotates the wrist counterclockwise as shown in FIG. 6 (a), the wearer can check the first image 201 without difficulty. Thus, even if the wearable device 100 determines that the wearer holds an object, the wearable device 100 can maintain the display position of the first image 201 when the wrist is rotated in the second direction.

Further, the operations of the wearable device 100 mentioned with reference to FIG. 6 may be selectively combined with the operation of the wearable device 100 mentioned with reference to FIGS. 4 and 5 and the operations of the wearable device 100 which will be described with reference to FIGS. 7 to 11.

Figure 7:
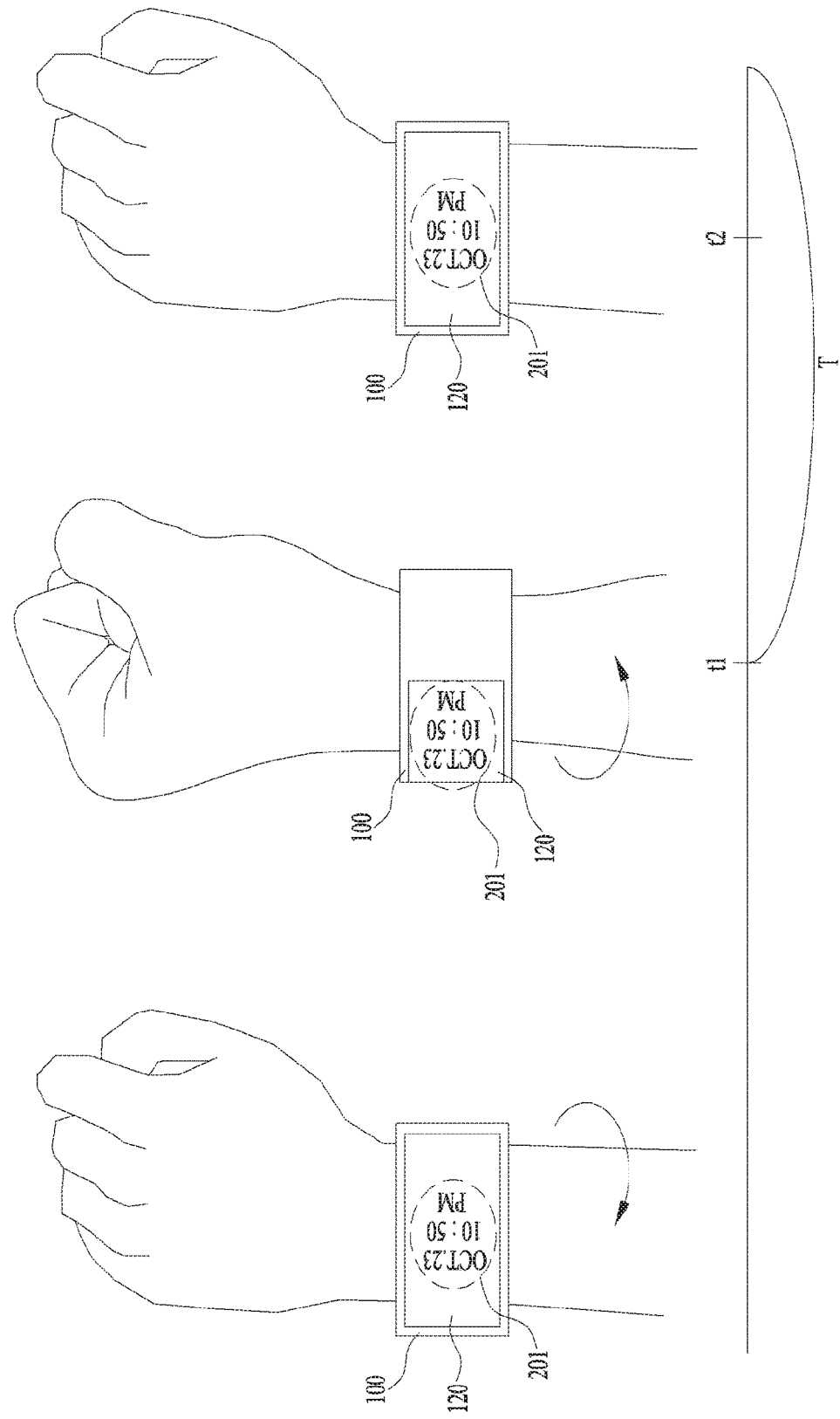
FIG. 7 illustrates that the wearable device switches a mode according to an embodiment of the present invention.

FIG. 7 illustrates that the wearable device switches a mode according to an embodiment of the present invention.

Referring to FIG. 7, the wearer of the wearable device 100 holds an object (not shown in the drawing). In addition, the wearer of the wearable device 100 rotates the wrist in the first direction (e.g., clockwise) at a time t1 and then rotates the wrist again in the second direction (e.g., counterclockwise) at a time t2. Here, a difference between the times t1 and t2 is smaller than a predetermined time T. In this case, the wearable device 100 can switch to a voice mode. When entering the voice mode, the wearable device 100 may output information related to the first image as a voice message. For example, the wearable device 100 may output a voice message such as "the current time is 10:50". Moreover, the wearable device operating in the voice mode can be controlled according to a voice input.

In other words, the wearable device 100 can output the information related to the first image 201 as the voice message when the following conditions are satisfied: a detected hand shape matches the predetermined hand shape; detected grip strength is equal to or greater than the predetermined grip strength; the wearable device 100 is rotated in the first direction; and the wearable device 100 is rotated again in the second direction within the predetermined time T from the time t1 at which the wearable device 100 is rotated in the first direction. For example, the information related to the first image 201 may include weather, current time, current date, received message content, message sender information, and/or schedule information.

Further, the operations of the wearable device 100 mentioned with reference to FIG. 7 may be selectively combined with the operation of the wearable device 100 mentioned with reference to FIGS. 4 to 6 and the operations of the wearable device 100 which will be described with reference to FIGS. 8 to 11.

Figure 8:
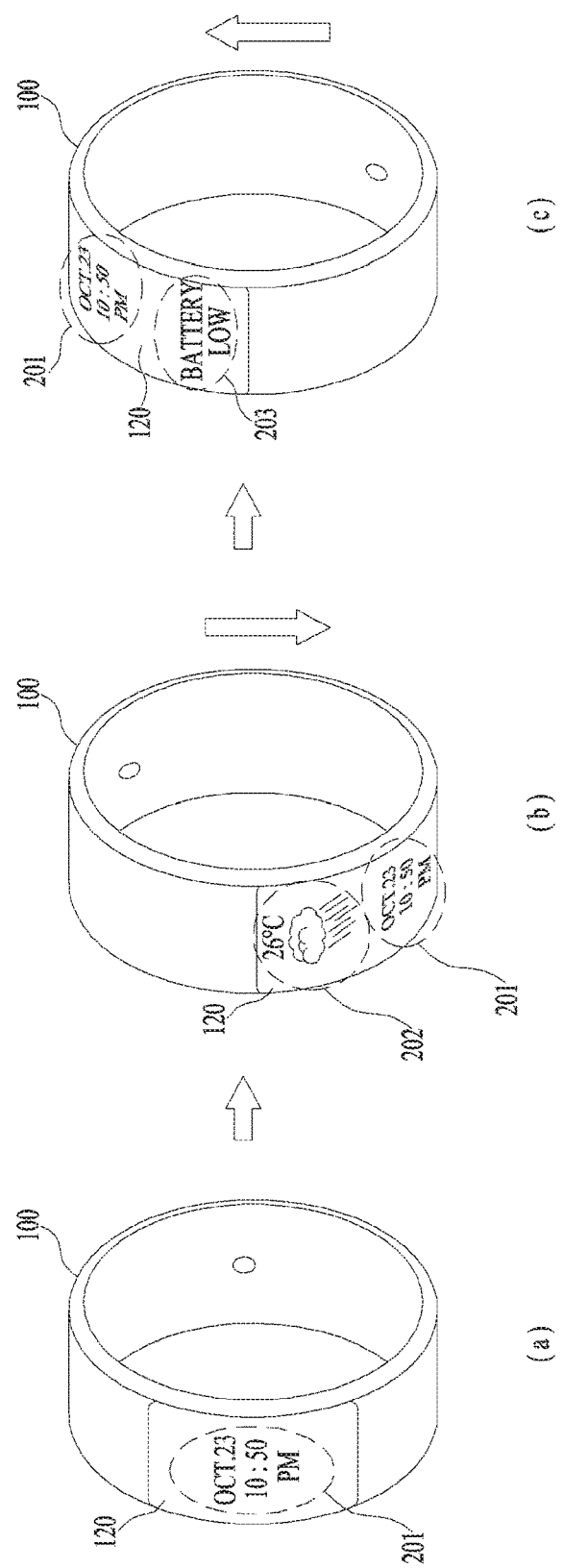
FIG. 8 illustrates that a display image is changed according to a wrist rotation direction.

FIG. 8 illustrates that a display image is changed according to a wrist rotation direction.

Referring to FIG. 8, the wearable device 100 displays the first image 201 on a first position. In addition, the wearable device 100 senses grip strength less than the predetermined grip strength and in this case, the wearer may not hold an object. Moreover, the movement of the wearable device 100 may be within the predetermined range. That is, the wearer may be in a stable state without holding an object.

In this case, when the detected grip strength is less than the predetermined grip strength and the movement of the wearable device 100 is within the predetermined range, the wearable device 100 may set the current orientation as the reference orientation. For example, in FIG. 8 (a), the wearable device 100 may set the current orientation of the wearable device 100 as the reference orientation.

In addition, as shown in FIG. 8 (b), if the wearable device 100 is rotated in the first direction with respect to the reference orientation, the wearable device 100 may display a second image 202 on a position obtained by moving the display position of the first image 201 in the second direction opposite to the first direction.

Moreover, as shown in FIG. 8 (c), if the wearable device 100 is rotated in the second direction with respect to the reference orientation, the wearable device 100 may display a second image 203 on a position obtained by moving the display position of the first image 201 in the first direction opposite to the second direction.

In other words, when determining that the wearer hold no object and the wearer is in the stable state, the wearable device 100 may display additional information based on the rotation of the wearable device 100.

Additionally, the aforementioned first, second, and third images 201, 202, and 203 may include different information. For example, the first image 201 may show the current time, the second image 202 may show the current weather, and the third image 203 may show the current battery information. However, this is merely an example and the present invention is not limited thereto.

Further, the operations of the wearable device 100 mentioned with reference to FIG. 8 may be selectively combined with the operation of the wearable device 100 mentioned with reference to FIGS. 4 to 7 and the operations of the wearable device 100 which will be described with reference to FIGS. 9 to 11.

Figure 9:
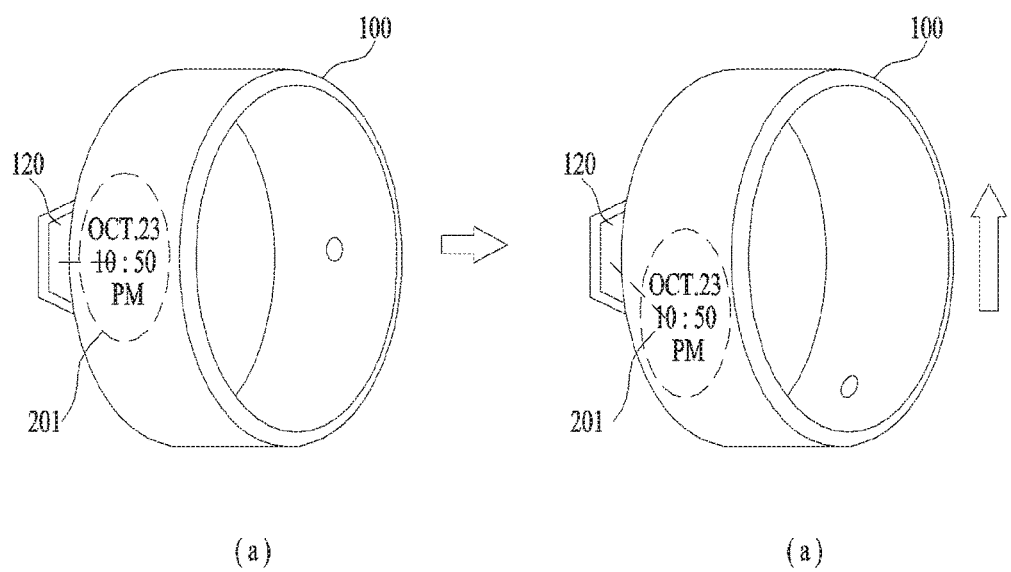
FIG. 9 illustrates that a display position is changed according to a wrist rotation.

FIG. 9 illustrates that a display position is changed according to a wrist rotation.

Basically, operating principles of the wearable device 100, which will be described with reference to FIG. 9, are the same as those mentioned with reference to FIG. 5. That is, when the wearable device 100 determines that the wearer holds an object and the wearable device 100 is rotated in a predetermined direction, the wearable device 100 may change the display position of the first image 201 from a position shown in FIG. 9 (a) to a position shown in FIG. 9 (b).

Referring to FIG. 9, the wearable device 100 has the display unit 120 for projecting the first image 201. Specifically, the display unit 120, which is protruded from the surface of the wearable device 100, projects the first image to the surface of the wearable device 100. The display unit 120 may include a prism, lens, and/or mirror for projection. Thus, the display unit 120 may rotate the prism, lens, and/or mirror in order to move the display position of the first image 201 as shown in FIG. 9 (b). In addition, the display position of the first image 201 may be changed based on the rotation of the prism, lens, and/or mirror.

Further, the operations of the wearable device 100 mentioned with reference to FIG. 9 may be selectively combined with the operation of the wearable device 100 mentioned with reference to FIGS. 4 to 8 and the operations of the wearable device 100 which will be described with reference to FIGS. 10 to 11.

FIG. 10 illustrates that that a display position is changed according to gaze.

The wearable device 100 may further include an image sensing unit or an eye sensing unit. The wearable device 100 may detect that a different person, rather than the wearer, gazes on the wearable device 100 based on image sensing. When detecting that the different person gazes on the wearable device 100, the wearable device 100 may change the image display position.

As shown in the left drawing of FIG. 10, the wearable device 100 can display the first image 201 on the top portion of the display unit 120. In this case, the different person, rather than the wearer, may try to peek at the first image 201 as shown in the right drawing of FIG. 10.

Although the first image 201 is illustrated as the current time in FIG. 10, the first image 201 may be an image including personal information. For example, the first image 201 may include a received text message. That is, the wearer of the wearable device 100 may desire to hide the first image 201.

Thus, when detecting that the different person gazes the wearable device 100, the wearable device 100 may move the display position of the first image 201 close to the wearer as shown in FIG. 10. The wearable device 100 may improve personal information security by moving the display position depending on whether another person gazes the first image 201.

Further, the operations of the wearable device 100 mentioned with reference to FIG. 10 may be selectively combined with the operation of the wearable device 100 mentioned with reference to FIGS. 4 to 9 and the operations of the wearable device 100 which will be described with reference to FIG. 11.

FIG. 11 is a flowchart for explaining a method for controlling the wearable device according to an embodiment of the present invention.

The wearable device displays the first image on the first position on the outer surface of the wearable device [1101]. The first image may include various information as described with reference to FIG. 5. The wearable device senses the wrist tendons and then detects the hand shape and the grip strength of the wearer based on the sensed tendons [1102]. As described with reference to FIG. 4, the wearable device can sense the tendons passing through the wrist and deformation of the tendons using the tendon sensing unit. In addition, the wearable device can sense the orientation of the wearable device [1103]. As mentioned with reference to FIG. 4, the wearable device may use the orientation sensing unit to sense the orientation.

When the detected hand shape matches the predetermined hand shape and the detected grip strength is equal to or greater than the predetermined grip strength [1104], the wearable device may determine that the wearer holds an object. In this case, if the wearable device is rotated in the first direction, the wearable device may display the first image on a second position obtained by moving the first position in the second direction [1105]. In this case, the first and second directions correspond to rotation directions with respect to the wrist and they are opposite each other.

The control method for the wearable device described with reference to FIG. 11 may be selectively combined with the operation of the wearable device mentioned with reference to FIGS. 4 to 10. The wearable device and control method therefor according to the present invention are not limited to the aforementioned configurations of the embodiments and various modifications may be made by combining some or all of the embodiments.

The control method for the wearable device according to the present invention may be implemented as software in a processor-readable recording medium included in the wearable device. The processor-readable recording medium includes all kinds of recording media storing data readable by a processor. Examples of the processor-readable recording medium include a ROM, a RAM, a CD-ROM, a magnetic tape, a floppy disk, an optical data storage device and the like. In addition, the processor-readable recording medium may be distributed to computer systems connected through a network, stored and executed as code readable in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

INDUSTRIAL APPLICABILITY

The present invention has industrial applicability in that the invention can be reproducibly applied to a terminal device.

What is claimed is:

1. A wearable device configured to be worn on a wrist, the wearable device comprising:
   a display;
   a first sensor configured to sense changes of anatomical structure located relative to the wrist;
   a second sensor configured to sense orientation of the wearable device relative to a reference; and
   a processor configured to:
   cause the display to display a first image at a first location;
   identify hand shape and grip strength of a user wearing the wearable device based on input from the first sensor;
   identify rotation of the wearable device based on input from the second sensor; and
   cause the display to stop displaying the first image at the first location and display the first image at a second location that is in a first direction from the first location, when the identified rotation of the wearable device occurs in a second direction, and while the identified hand shape matches a defined hand shape and the identified grip strength is equal to or greater than a threshold value during a defined period of time, wherein the first direction is determined according to the second direction.

2. The wearable device of claim 1, wherein the processor is further configured to:
   cause the display to stop displaying the first image at the second location and display the first image at a third location that is in a third direction from the second location, when the identified hand shape matches a defined hand shape, the identified grip strength is equal to or greater than a threshold value during the defined period of time, and the identified rotation of the wearable device occurs in a fourth direction, wherein the third direction corresponds to the fourth direction.

3. The wearable device of claim 1, further comprising:
   a speaker; wherein the processor is further configured to:
   identify rotation of the wearable device in a third direction based on input from the second sensor; and
   cause the speaker to provide audio output related to the first image when the identified rotation of the wearable device occurs in the third direction within a defined period of time after the rotation in the second direction.

4. The wearable device of claim 3, wherein the information related to the first image comprises at least one of weather information, current time information, current date information, received message information, message sender information, or current schedule information.

5. The wearable device of claim 1, further comprising:
   a speaker; and
   a microphone; wherein the processor is further configured to:
   control the wearable device based on a voice command received via the microphone.

6. The wearable device of claim 1, wherein the identifying of the rotation occurs when movement of the wearable device is within a defined range of movement.

7. The wearable device of claim 1, wherein the display comprises a flexible display that is at least partially located in the wearable device.

8. The wearable device of claim 7, wherein the flexible display comprises a plurality of display panels.

9. The wearable device of claim 1, wherein the display is a projector that causes the first image to be projected onto an outer surface of the wearable device.

10. The wearable device of claim 9, wherein the processor is further configured to:
    change projection direction of the first image according to the second direction of the identified rotation.

11. The wearable device of claim 1, wherein the processor is further configured to:
    determine the second location at which the first image is displayed based on the orientation of the wearable device sensed by the second sensor.

12. The wearable device of claim 1, wherein the processor is configured to:
    set a current orientation of the wearable device as a reference orientation, when the identified grip strength is less than a threshold value and any movement of the wearable device is within a defined range according to input from the second sensor;
    cause the display to display a second image at a third location when the identified rotation is in the second direction relative to the reference orientation; and
    cause the display to display a third image at a fourth location when the identified rotation is in a third direction, which is opposite that of the second direction.

13. The wearable device of claim 12, wherein the first image, the second image, and the third image comprise different information.

14. The wearable device of claim 13, wherein at least one of color, brightness, or contrast of the first image displayed at the second location is different from that of the first image displayed at the first location.

15. The wearable device of claim 1, wherein the first image displayed at the second location comprises only a portion of data of the first image displayed at the first location.

16. The wearable device of claim 1, wherein the anatomical structure includes a tendon.

17. A method of controlling a wearable device having a display and configured to be worn on a wrist, the method comprising:
    sensing, using a first sensor, changes of an anatomical structure located relative to the wrist;
    sensing, using a second sensor, orientation of the wearable device relative to a reference;
    displaying, on the display, a first image at a first location;
    identifying hand shape and grip strength of a user wearing the wearable device based on input from the first sensor;
    identifying rotation of the wearable device based on input from the second sensor; and
    stopping the displaying of the first image at the first location and displaying the first image at a second location that is in a first direction from the first location, when the identified rotation of the wearable device occurs in a second direction, and while the identified hand shape matches a defined hand shape and the identified grip strength is equal to or greater than a threshold value during a defined period of time, wherein the first direction is determined according to the second direction.

18. The method of claim 17, further comprising:
    stopping the displaying the first image at the second location and displaying the first image at a third location that is in a third direction from the second location, when the identified hand shape matches a defined hand shape, the identified grip strength is equal to or greater than a threshold value during the defined period of time, and the identified rotation of the wearable device occurs in a fourth direction, wherein the third direction corresponds to the fourth direction.

19. The method of claim 17, further comprising:
identifying rotation of the wearable device in a third direction based on input from the second sensor; and
producing audio output at a speaker that is related to the first image, when the identified rotation of the wearable device occurs in the third direction within a defined period of time after the rotation in the second direction.

20. The method of claim 17, wherein at least one of color, brightness, or contrast of the first image displayed at the second location is different from that of the first image displayed at the first location.

21. A wearable device configured to be positioned on a wrist, the wearable device comprising:
a display;
a first sensor configured to sense changes of anatomical structure located relative to the wrist;
a second sensor configured to sense orientation of the wearable device relative to a reference; and
a processor configured to:
cause the display to display a first image;
identify hand shape and grip strength of a user wearing the wearable device based on input from the first sensor;
identify rotation of the wearable device based on input from the second sensor; and
cause the display to display the first image at a different location of the display, when rotation of the wearable device is identified, and while the identified hand shape matches a defined hand shape and the identified grip strength exceeds a threshold value during a defined period of time, wherein the different location is one of a plurality of locations of the display and is determined according to direction of the identified rotation.

* * * * *